(12) United States Patent
Hwang et al.

(10) Patent No.: US 6,436,363 B1
(45) Date of Patent: Aug. 20, 2002

(54) PROCESS FOR GENERATING HYDROGEN-RICH GAS

(75) Inventors: H. Shinn Hwang, Livingston; Robert J. Farrauto, Princeton, both of NJ (US)

(73) Assignee: Engelhard Corporation, Iselin, NJ (US)

( * ) Notice: Subject to any disclaimer, the term of this patent is extended or adjusted under 35 U.S.C. 154(b) by 105 days.

(21) Appl. No.: 09/652,710

(22) Filed: Aug. 31, 2000

(51) Int. Cl.$^7$ .................................................. C01B 3/26
(52) U.S. Cl. ........................................ 423/651; 252/373
(58) Field of Search ............................. 423/418.2, 651, 423/652, 437.1; 252/373

(56) References Cited

U.S. PATENT DOCUMENTS

| | | | |
|---|---|---|---|
| 3,481,722 A | 12/1969 | Pfefferle | 48/214 |
| 3,976,507 A | 8/1976 | Bloomfield | 136/86 R |
| 4,501,823 A | 2/1985 | Masuda | 502/304 |
| 4,522,894 A | 6/1985 | Hwang et al. | 429/17 |
| 4,844,837 A | 7/1989 | Heck et al. | 252/373 |
| 4,927,857 A | 5/1990 | McShea et al. | 518/703 |
| 5,112,527 A | 5/1992 | Kobylinski | 252/373 |

FOREIGN PATENT DOCUMENTS

| | | | |
|---|---|---|---|
| DE | 100 62 662 A1 | 7/2001 | B01J/23/89 |
| EP | 0 112 613 | 7/1984 | C01B/3/38 |
| EP | 0 495 534 A2 | 7/1992 | B01J/23/46 |
| EP | 0 741 107 A2 | 11/1996 | C01B/3/38 |
| EP | 0 673 074 B1 | 7/1998 | H01M/8/06 |
| GB | 2 247 465 A | 3/1992 | C01B/3/34 |
| WO | WO 96/00186 | 1/1996 | C01B/3/38 |
| WO | WO 99/48805 | 9/1999 | C01B/3/40 |
| WO | WO 00/00425 | 1/2000 | C01B/3/38 |
| WO | WO 00/72954 A1 | 12/2000 | B01J/8/02 |

*Primary Examiner*—Stanley S. Silverman
*Assistant Examiner*—Maribel Medina
(74) *Attorney, Agent, or Firm*—Richard A. Negin

(57) ABSTRACT

A process for catalytically generating a hydrogen-rich gas from a hydrocarbon feed. A stream comprising the hydrocarbon feed , water and air is preheated to a temperature sufficiently high to initiate catalytic partial oxidation of the hydrocarbon feed. The preheated stream is then introduced into an autothermal reactor containing a layered catalyst member at a temperature sufficient to initiate and sustain both catalytic partial oxidation and catalytic steam reforming. At least part of the hydrocarbon feed is catalytically partially oxidized to produce a hydrogen-rich gas comprising hydrogen and carbon oxides and hydrocarbons remaining in the feed are steam reformed to produce further quantities of the hydrogen-rich gas. The layered catalyst member comprises a monolith substrate containing at least one layer of a steam reforming catalyst in contact with at least one layer of a catalytic partial oxidation catalyst. The steam reforming catalyst comprises one or more platinum group metal components and the catalytic partial oxidation catalyst comprises palladium components.

34 Claims, 1 Drawing Sheet

PROCESS FOR GENERATING HYDROGEN-RICH GAS

FIELD OF THE INVENTION

The invention pertains to a process for catalytically generating hydrogen-rich gases (frequently referred to as "synthesis gas" or "syn gas") using a layered catalyst member in an autothermal reactor (also referred to in the prior art as an autothermal reformer).

BACKGROUND OF THE INVENTION

Processes for catalytically partially oxidizing and/or catalytically steam reforming a hydrocarbon feed to produce hydrogen-rich gases are well known in the prior art. Typically, such processes utilize one reactor to catalytically partially oxidize a hydrocarbon feed to produce hydrogen-rich gases or to catalytically steam reform a hydrocarbon feed to produce hydrogen-rich gases. Alternatively, the prior art discloses processes for carrying out both the catalytic partial oxidation reaction and the catalytic steam reforming reaction in one autothermal reactor. Other prior art discloses carrying out both reactions in a single autothermal reactor containing catalyst zones within which each type of reaction is carried out. Exemplary prior art disclosing such processes include the following patents and published patent applications: U.S. Pat. Nos. 3,481,722; 3,976,507; 4,501,823; 4,522,894; 4,844,837; 4,927,857; 5,112,527; EP 0 112 613 A2; EP 0 495 534 A2; EP 0 673 074 B1; WO 96/00186; WO 99/48804; and WO 99/48805.

The prior art processes referred to above are more complex than the process of the present invention which may be carried out in a single autothermal reactor without the need to provide multiple sequential catalyst zones in the reactor. The catalytic partial oxidation reaction is exothermic in nature and the heat generated thereby is used to carry out the steam reforming reaction which is endothermic in nature. By having the catalytic partial oxidation layer(s) in intimate contact with the steam reforming catalyst layer(s), the process heat can be more effectively managed in an adiabatic reactor, i.e. an autothermal reactor. By having the two catalyst layers in contact with one another, heat loss which otherwise occurs from the use of multiple autothermal reactors or an autothermal reactor containing multiple catalyst zones is significantly minimized.

The process of the present invention also results in savings in reactor volume and monolith substrate costs as well as less pressure drop throughout the catalytic partial oxidation and steam reforming reactions. The process of the present invention thereby provides more efficient utilization and uniform usage of the heat generated by the exothermic catalytic partial oxidation reaction, thus allowing he endothermic steam reforming reaction to be carried out at a somewhat higher temperature due to lower heat loss and concomitant higher reaction rate and under adiabatic conditions. The result is that the catalytic partial oxidation reaction temperature is somewhat lowered, estimated to be by about 50 degrees and concomitantly, the steam reforming reaction temperature is estimated to be raised by about 50 degrees, thereby improving catalyst life and resulting in higher steam reforming reaction rates. Moreover, by utilizing the catalytic partial oxidation and steam reforming catalysts as layers in contact with one another, adverse reactions such as the reaction of oxygen with rhodium and the reaction of oxygen with platinum, may be avoided

SUMMARY OF THE INVENTION

An object of the present invention is to provide a process which will result in a more efficient generation of hydrogen-rich gases than prior art processes.

A further object of the present invention is to provide a process which will result in a more economical generation of hydrogen-rich gases than prior art processes.

The present invention pertains to the generation of hydrogen-rich gases by the following steps:

(a) introducing a preheated inlet stream comprising a hydrocarbon feed, water and air into an autothermal reactor containing a layered catalyst member and contacting the stream with the member at a temperature sufficient to initiate and sustain both catalytic partial oxidation and steam reforming (for the purposes of this invention, the term "water" will be understood to encompass "steam");

(b) catalytically partially oxidizing at least part of the hydrocarbon feed to produce an effluent comprising hydrogen and carbon oxides; and (c) steam reforming hydrocarbons remaining in the feed to produce a hydrogen-rich effluent.

The layered catalyst member comprises a monolith substrate containing on a surface thereof at least one layer of a steam reforming catalyst in contact with at least one layer of a catalytic partial oxidation catalyst. The steam reforming catalyst layer(s) and the catalytic partial oxidation catalyst layer(s) comprise the components described below.

DESCRIPTION OF THE PREFERRED EMBODIMENTS

Figure 1:
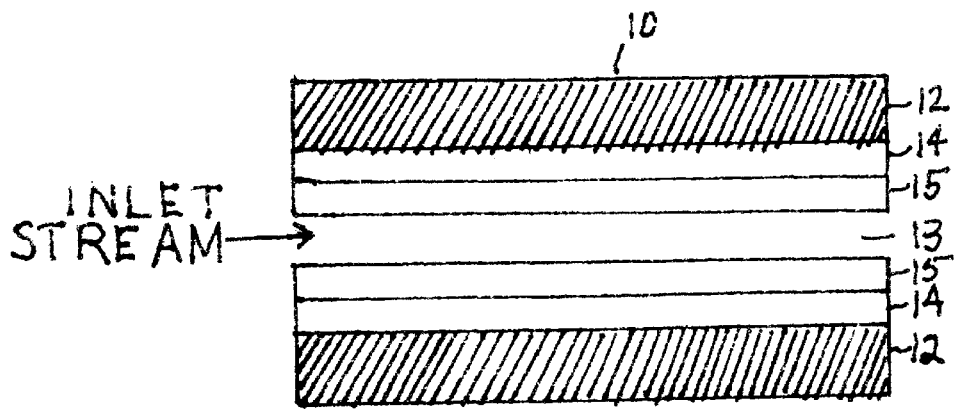
FIG. 1 is a perspective view of a preferred orientation of a first embodiment of the layered catalyst member employed in the process of the present invention.

In the first step of the process of the present invention, an inlet stream comprising the hydrocarbon feed from which the hydrogen-rich gas is to be generated together with air (or an oxygen-containing gas) and water is preheated to a temperature of about 200 to about 900° C. and is fed into a suitable autothermal reactor which is typically maintained at a temperature of about 250 to about 1100° C. The inlet stream is typically fed into the autothermal reactor at a volumetric hourly rate of about 2,000 to about 500,000 volumes per volume of monolith substrate. The autothermal reactor contains the layered catalyst member which is more filly described below. The stream is contacted with the layered catalyst member at a temperature sufficient to initiate and sustain both catalytic partial oxidation and steam reforming.

The hydrocarbon feed may consist of $C_5$ and heavier hydrocarbons, but is preferably a normally gaseous or readily vaporizable hydrocarbon such as a $C_1$–$C_4$ alkane, e.g, methane, propane, butane, etc. The amounts of the hydrocarbon feed, water and air in the inlet stream introduced into the autothermal reactor are typically controlled to maintain a water to carbon ratio of at least about 0.3:1 and an oxygen to carbon ratio of from about 0.2 to 0.7:1.

In general, adiabatic conditions will prevail in the autothermal reactor due to the fact that the partial oxidation reaction is exothermic in nature and the heat generated in the course of such reaction is usually sufficient to initiate and sustain the steam reforming reaction which is endothermic in nature. Accordingly, by proper selection of the preheat temperature, reactor design, volumetric hourly rate, etc., both reactions may be carried out within the reactor while the reactor temperature is kept within the range of about 250 to about 1100° C. without the need to supply external heat or cooling to the reactor. However, it is within the scope of the present invention to supply heat or cooling to the reactor as desired in order to continuously maintain both reactions at high reaction rates.

In the second step of the process, the hydrocarbon feed is catalytically partially oxidized by contact with the catalytic partial oxidation catalyst layer(s). The resultant effluent will comprise hydrogen and carbon oxides.

In the third step of the process, hydrocarbons remaining in the feed which are not catalytically partially oxidized are steam reformed by contact with the steam reforming catalyst layer(s), thereby producing a hydrogen-rich effluent.

Preferably, the hydrogen-rich gas effluent from the third step of the process is subjected to a further water-gas shift reaction. In the course of the steam reforming reaction, the hydrocarbon reacts with water to yield a product gas containing primarily hydrogen and carbon monoxide, plus any unreacted hydrocarbons. In order to reduce the carbon monoxide level and increase the hydrogen gas level, the effluent may be passed into a converter in which the effluent is contacted with a catalyst, e.g., Fe/Cr oxides or Cu/Zn oxide, such that the carbon monoxide will at with water to yield carbon dioxide and firer amounts of hydrogen.

The layered catalyst member employed in the process of the present invention comprises a monolith substrate and at least one layer of a catalytic partial oxidation catalyst in contact with at least one layer of a steam reforming catalyst. Either the layer of the catalytic partial oxidation catalyst or the layer of the steam reforming catalyst or both layers may be disposed on the surface of the monolith substrate, provided that the layer of the catalytic partial oxidation catalyst is in contact with the layer of the steam reforming catalyst. It should also be understood that the layered catalyst member may also comprise multiple steam reforming layers and/or multiple catalytic partial oxidation catalyst layers with each such layer comprising a different steam reforming catalyst composition and/or a different partial oxidation catalyst composition. It is particularly preferred that the preheated inlet steam initially comes into contact with the catalytic partial oxidation catalyst layer.

Preferably, the catalytic partial oxidation catalyst and the steam reforming catalyst layers are disposed such that one layer is present on top of, and in contact with, the other layer. It is particularly preferred that the steam reforming catalyst layer is present on the surface of the monolith substrate and the catalytic partial oxidation layer overlies, and is in contact with, the steam reforming catalyst layer. Alternatively, the steam reforming catalyst and catalytic partial oxidation catalyst layers are "zoned" or "graduated" and disposed in the same plane of the monolith substrate such that they are in overlapping contact with each other. For the purposes of the present invention, the terms "zoned" or "graduated" are used interchangeably and are understood to mean that the thickness of each layer, and hence the concentration of the catalyst component(s) in each layer, is gradually changed. In a particularly preferred embodiment, the thickness of the catalytic partial oxidation catalyst layer is at its maximum thickness at the point of initial contact with the preheated inlet stream and is gradually reduced in thickness along the length of the monolithic substrate. Concurrently, the thickness of the steam reforming catalyst layer is very low at the point of initial contact with the preheated inlet stream and is gradually increased in thickness along the length of the monolithic substrate. These arrangements are discussed in greater detail below.

The Monolith Substrate

The catalytic partial oxidation catalyst layer and/or the steam reforming catalyst layer are disposed on the surface of a monolith substrate of the type comprising one or more monolithic bodies having a plurality of finely divided gas flow passages extending therethrough. Such monolith substrates are often referred to as "honeycomb" type substrates and are well known in the prior art. A preferred form of the substrate is made of a refractory, substantially inert, rigid material which is capable of maintaining its shape and a sufficient degree of mechanical conditions at high temperatures of about 1450° C. Typically, a material is selected for use as the substrate which exhibits a low thermal coefficient of expansion, good thermal shock resistance and preferably low thermal conductivity.

Two general types of materials of construction for monolith substrates are known. One is a ceramic-like porous material composed of one or more metal oxides, e.g., alumina, alumina-silica, alumina-silica-titania, mullite, cordierite, zirconia, zirconia-ceria, zirconia-spinel, zirconia-mullite, siliconcarbide, etc. A particularly preferred and commercially available material for use as the substrate for operations below about 1093° C. is cordierite, which is an alumina-magnesia-silica material. For applications involving operations above about 1093° C., an alumina-silica-titania material is preferred.

Monolith substrates are commercially available in various sizes and configurations. Typically, the monolithic substrate would comprise, e.g., a cordierite member of generally cylindrical configuration (either round or oval in cross section) and having a plurality of parallel gas flow passages of regular polygonal cross sectional extending therethrough. The gas flow passages are typically sized to provide from about 50 to about 1,200, preferably 200–600, gas flow channels per square inch of face area.

The second major type of preferred material of construction for the monolith substrate is a heat- and oxidation-resistant metal, such as stainless steel or an iron-chromium alloy. Monolith substrates are typically fabricated from such materials by placing a flat and a corrugated metal sheet one over the other and rolling the stacked sheets into a tubular configuration about an axis parallel to the configurations, to provide a cylindrical-shaped body having a plurality of fine, parallel gas flow passages, which may range, typically, from about 200 to about 1,200 per square inch of face area.

The monolith substrate may also be present in the form of a ceramic or metal foam. Monolith substrates in the form of foams are well known in the prior art, e.g., see U.S. Pat. No. 3,111,396 and SAE Technical Paper 971032, entitled "A New Catalyst Support Structure For Automotive Catalytic Converters" (February, 1997). The monolith substrate may also be present in the form of a heat exchanger, e.g., a shell-and-tube exchanger or a fin-type exchanger of the type commonly employed in automobile radiators.

The steam reforming catalyst layer and/or the catalytic partial oxidation catalyst layer may be deposited directly on the surface of the monolith substrate. However, it is preferred that a binder coating be deposited on the surface of a metallic monolithic substrate, i.e, interposed between the surface of the monolithic substrate and the steam reforming catalyst layer and/or the catalytic partial oxidation catalyst layer. Such binder coating will typically be present in an amount of up to about 1.0 g/in$^3$ of the monolith substrate and typically comprises a high surface area alumina.

The Catalytic Partial Oxidation Catalyst Layer

The catalyst employed in the catalytic partial oxidation catalyst layer desirably should meet several criteria. The catalyst should be able to operate under conditions which vary from oxidizing at the inlet of the reactor to reducing conditions at the exit of the reactor. The catalyst should be capable of operating effectively and without significant temperature degradation over a temperature range of about 400 to 1050° C. The catalyst should operate effectively in the presence of carbon monoxide, olefins, aromatic hydrocarbons and sulfur compounds. The catalyst should provide for low levels of coking such as by preferentially catalyzing the reaction of carbon with water to form carbon monoxide and hydrogen thereby permitting the formation of only a low level of carbon on the surface of the catalyst. The catalyst must be able to resist poisoning from such common poisons such as sulfur and halogen compounds. Moreover, all of the foregoing requirements must be satisfied simultaneously.

The catalytic partial oxidation catalyst layer preferably comprises one or more "platinum group" metal components which have been found to satisfy the requirements stated above. As used herein, the term "platinum group" metal means platinum, palladium, rhodium, iridium, osmium, ruthenium and mixtures thereof. Preferred platinum group metal components are palladium and platinum and optionally, rhodium, Preferably, the catalytic partial oxidation catalyst layer comprises, on an elemental metal basis, about 10 to about 90% by weight of palladium components and about 10 to about 90% by weight of platinum components. Typically, the catalytic partial oxidation catalyst layer will be present in an amount of about 0.1 to about 3.0 g/in$^3$ of the substrate.

The platinum group metal components may optionally be supplemented with one or more base metals, particularly base metals of Group VII, Group IB, Group VB and Group VIB of the Periodic Table of Elements. Preferably, the base metal is one or more of iron, cobalt, nickel, copper, vanadium and chromium.

The Steam Reforming Catalyst Layer

The catalytically active metals for the steam reforming catalyst layer comprise any of the catalytic metal components known for such purpose, e.g., nickel, cobalt and mixtures thereof. Preferably, the steam reforming catalyst comprises a platinum group metal component such as platinum, palladium, rhodium, iridium, osmium, ruthenium and mixtures thereof. Particularly preferred steam reforming catalysts for use in the steam reforming catalyst layer include platinum, palladium and rhodium metal components, especially a mixture comprising, on an elemental metal basis, about 10 to about 100% by weight of rhodium components and about 90 to about 0% by weight of platinum components. Typically, the steam reforming catalyst layer will be present in an amount of about 0.1 to about 5.0 g/in$^3$ of the substrate.

The steam reforming catalyst layer(s) and the catalytic partial oxidation catalyst layer(s) will be present in the form of washcoats which are "painted" on the surface of the monolith subs. Such washcoats typically comprise alumina which has been impregnated with the steam reforming catalyst and the catalytic partial oxidation catalyst. Preferably, each layer comprises a catalyst mixed with one or more rare earth metal oxides and/or one or more alkaline earth metal oxides, e.g., one or more oxides of lanthanum, cerium, zirconium, praesidium, yttrium, calcium, barium, strontium, magnesium and mixtures thereof. Typically, the rare earth metal oxides and/or the alkaline earth metal oxides will be present in an amount of about 2 to about 10 weight percent, based on the weight of the oxides plus gamma-alumina and each washcoat will be present in an amount of about 0.02 to about 5.0 g/in$^3$ of the monolith substrate.

The initial catalyst layer is deposited upon the surface of the monolith substrate. This step will be illustrated with the deposition of the steam reforming catalyst layer which is the preferred version of the first embodiment of the layered catalyst member employed in the process of the present invention. The steam reforming catalyst, e.g., one or more platinum group metal components such as a mixture of platinum and rhodium components (preferably containing one or more rare earth and/or alkaline metal oxides), is typically applied by immersing the monolith substrate in an aqueous slurry containing platinum-rhodium (and preferably one or more rare earth and/or alkaline earth metal oxides). A typical platinum-rhodium solution may be prepared by dissolving 42 g platinum in the form of $H_2Pt(OH)_6$ in monoethanolamine and 18 g Rh in the form of $Rh(NO_3)$ $2H_2O$ and combining the materials in water to provide a solution having a volume of 1,186 ml and a pH of 0.7 after adjustment with concentrated nitric acid. The resultant monolith substrate is immersed in the Pt-Rh solution, dried, e.g., for about 30 minutes at about 120° C., to reduce the moisture content, and then baked in an air stream at a temperature of about 400 to about 650° C. for about 0.5 to about 4 hours, thereby resulting in a monolith substrate having a layer of a steam reforming catalyst comprising Pt and Rh components deposited upon the surface of the monolith substrate.

The above procedure is repeated for deposition of the second catalyst layer, i.e., the catalytic partial oxidation catalyst layer, upon the surface of the first catalyst layer, i.e., the steam reforming catalyst layer. The catalytic partial oxidation catalyst comprising, e.g., Pd and Pt components, is prepared by dissolving salts of the metals in water, e.g., palladium chloride and chloroplatinic acid. The monolith substrate containing the layer of the steam reforming catalyst is then immersed in the mixed Pd-Pt aqueous solution, dried, e.g., for about 30 minutes at about 120° C., to reduce the moisture content, and then baked in a hydrogen stream or an air stream at a temperature of about 300 to about 650° C. for about 0.5 to about 4 hours, thereby resulting in the finished layered catalyst member comprising the monolith substrate having a steam reforming catalyst layer on top of the substrate surface and a catalytic partial oxidation catalyst layer on top of the steam reforming catalyst layer.

A layered catalyst member having multiple layers of different steam reforming catalyst formulations and/or multiple layers of different catalytic partial oxidation catalyst formulations may be prepared in the same manner as indicated above. Each layer of the steam reforming catalyst formulation is applied in the same manner, dried and baked in the air stream before the next layer is applied.

The "zoned" layered catalyst member illustrated in FIG. 3 may be prepared as follows: The catalytic partial oxidation catalyst and steam reforming catalyst slurries are prepared in accordance with the procedures described above. In the first step, the substrate is immersed in a given slurry to a controlled length. In the second step, excess slurry is removed using an air knife. In the third step, the coated substrate is dried for one hour at 120° C. Thereafter, the first-third steps are repeated until the target catalyst concentration and location on the substrate are achieved. Finally, the coated substrate is baked as described above.

DETAILED DESCRIPTION OF THE DRAWINGS

FIG. 1 illustrates layered catalyst member 10 in accordance with the first embodiment. Layered catalyst member 10 comprises monolith substrate 12 containing channel 13 through which the inlet stream (comprising the hydrocarbon feed, water and air) flows. Steam reforming catalyst layer 14 is deposited upon the surface of monolith substrate 12 and catalytic partial oxidation catalyst layer 15 is deposited upon the surface of steam reforming catalyst layer 14 such that it is preferably in contact with layer 14 throughout its entire length. Catalyst member 10 is preferably oriented such the inlet stream enters the autothermal reactor (not shown) from the left and initially contacts catalytic partial oxidation catalyst layer 15.

Figure 2:
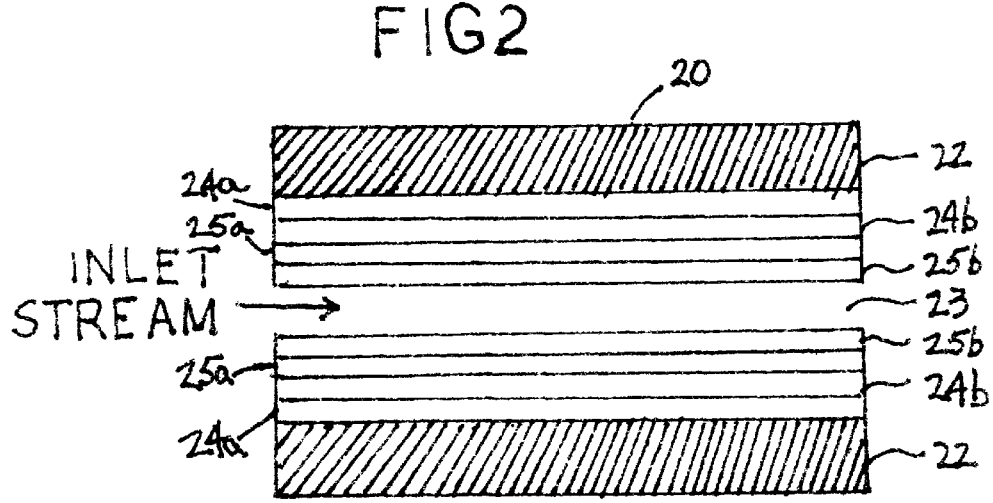
FIG. 2 is a perspective view of a preferred orientation of a second embodiment of the layered catalyst member employed in the process of the present invention

FIG. 2 illustrates layered catalyst member 20 in accordance with the second embodiment. Layered catalyst member 20 comprises monolith substrate 22 containing channel 23 through which the inlet stream (comprising the hydrocarbon feed, water and air) flows. Steam reforming catalyst layer 24a is deposited upon the surface of monolith substrate 22 and steam reforming catalyst layer 24b is deposited upon the surface of steam reforming catalyst layer 24a (steam reforming catalyst layers 24a and 24b contain different steam reforming catalyst formulations). Catalytic partial oxidation catalyst layer 25a is deposited on the surface of steam reforming catalyst layer 24b and catalytic partial oxidation layer 25b is deposited upon the surface of catalytic partial oxidation layer 25a (catalytic partial oxidation catalyst layers 25a and 25b contain different catalytic partial oxidation catalyst formulations). Layers 24a, 24b, 25a, and 25b are preferably in contact with each other throughout their entire length. As illustrated in FIG. 2, catalyst member 20 is preferably oriented such the inlet stream enters the autothermal reactor (not shown) from the left and initially contacts catalytic partial oxidation catalyst layer 25a.

Figure 3:
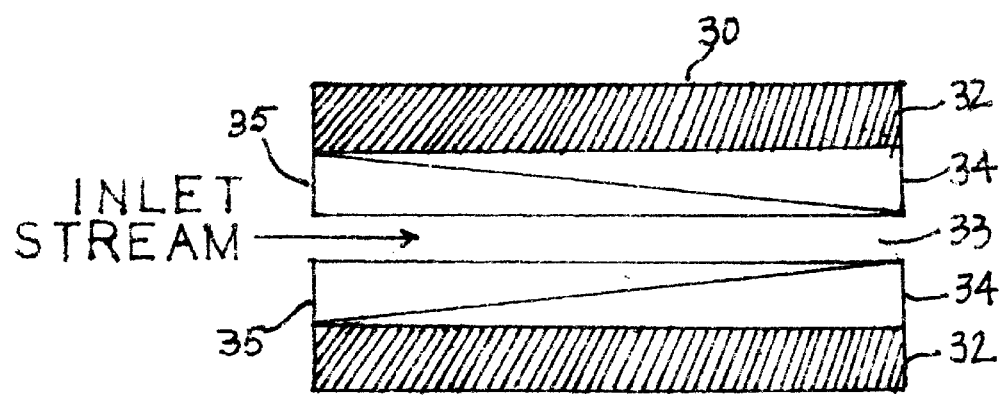
FIG. 3 is a perspective view of a preferred orientation of a third embodiment of the layered catalyst member employed in the process of the present invention.

FIG. 3 illustrates layered catalyst member 30 in accordance with the third embodiment. Layered catalyst member 30 comprises monolith substrate 32 containing channel 33 through which the inlet stream (comprising the hydrocarbon feed, water and air) flows. However, in contrast to the first embodiment illustrated in FIG. 1, catalytic partial oxidation catalyst layer 35 and steam reforming catalyst layer 34 are "zoned" or "graded". Catalytic partial oxidation catalyst layer 35 possesses its maximum thickness at the extreme left end of member 30, while steam reforming catalyst layer 34 possesses its maximum thickness at the extreme right end of member 30. The thickness of catalytic partial oxidation catalyst layer 35 gradually diminishes over the length of member 30 from its maximum at the extreme left end of member 30 to practically zero at the extreme right end of member 30, while the thickness of steam reforming catalyst layer 34 gradually diminishes over the length of member 30 from its maximum at the extreme right end of member 30 to practically zero at the extreme left end of member 30. Layers 35 and 34 are preferably in contact with each other throughout their entire length. Layered catalyst member 30 is preferably oriented such the inlet stream enters the autothermal reactor (not shown) from the left and initially contacts catalytic partial oxidation catalyst layer 35.

The invention will be further illustrated by the following nonlimiting examples in which all parts and percentages are on a weight basis, unless otherwise indicated to the contrary.

EXAMPLE A

Preparation of Catalytic Partial Oxidation Catalyst Layer

Two γ-alumina powders ("SBA 150" having a surface area of 150 $m^2/g$ and "VGL 15" having a surface area of 225 $m^2/g$ were blended in a 2/1 ratio in a mixer for 5 minutes. The blended y-alumina powder was then impregnated with a dilute solution of $H_2Pt(OH)_6$ in monoethanolamine and thereafter impregnated with a dilute solution of palladium nitrate to obtain a loading of 0.5% Pt and 4.8% Pd on the γ-alumina powder. This powder was then mixed with a composite of cerium and zirconium oxides and thereafter placed in a 2 gallon ball mill jar where the components were ether mixed with a mixed solution of cerium acetate, strontium acetate, lanthanum acetate, zirconium acetate, acetic acid and barium hydroxide. Additional water was then added to the ball mill jar to provide a slurry having a solids content of 45%.

The slurry was ball-milled until the particle size was 90%<10 microns. The solids content of the slurry was then further adjusted with additional water to provide a catalytic partial oxidation catalyst slurry having a solids content of 38% having a viscosity of 245 centipoise @ 20° C. and a pH of 4.53.

The catalytic partial oxidation catalyst layer is achieved by dipping a monolith substrate into the catalytic partial oxidation catalyst slurry and the excess slurry is then removed with an air knife to obtain the target wet gain of the washcoat on the monolith substrate. The resultant substrate is then dried for one hour at 120° C., and then calcined at 550° C. in air for two hours. The resultant washcoat contains 0.928 $g/in^3$ $Al_2O_3$, 0.04 $g/in^3$ $CeO_2$, 0.30 $g/in^3$ ceria/zirconia composite, 0.04 $g/in^3$ SrO, 0.033 $g/in^3$ LaO, 0.04 $g/in^3$ ZrO and 0.04 $g/in^3$ BaO.

EXAMPLE B

Preparation of Steam Reforming Catalyst Layer

Two γ-alumina powders ("SBA 150" having a surface area of 150 $m^2/g$ and "VGL 15" having a surface area of 225 $m^2/g$ were blended in a 2/1 ratio in a mixer for 5 minutes. The blended γ-alumina powder was then impregnated with a dilute solution of $H_2Pt(OH)_6$ in monoethanolamine and thereafter impregnated with a dilute solution of rhodium nitrate to obtain a loading of 0.96% Pt and 0.48% Rh on the γ-alumina powder. This powder was then mixed with a composite of cerium and zirconium oxides and thereafter placed in a 2 gallon ball mill jar where the components were further mixed with a mixed solution of cerium acetate, strontium acetate, zirconium acetate, acetic acid and barium hydroxide. Additional water was then added to the ball mill jar to provide a slurry having a solids content of 45%.

The slurry was ball-milled until the particle size was 90%<10 microns. The solids content of the slurry was then further adjusted with additional water to provide a steam reforming catalyst slurry having a solids content of 38% having a viscosity of 410 centipoise @ 20° C. and a pH of 6.49.

The steam reforming catalyst layer is achieved by dipping a monolith substrate into the steam reforming catalyst slurry and the excess slurry is then removed with an air knife to obtain the target wet gain of the washcoat on the monolith substrate. The resultant substrate is then dried for one hour at 120° C., and then calcined at 550° C. in air for two hours. The resultant washcoat contains 1.70 $g/in^3$ $Al_2O_3$, 0.052 $g/in^3$ $CeO_2$, 0.50 $g/in^3$ ceria/zirconia composite, 0.040 $g/in^3$ SrO, 0.052 $g/in^3$ ZrO and 0.96 $g/in^3$ BaO.

EXAMPLE C
Preparation of Double Layer Catalyst

The slurries as prepared in Examples A and B are employed in preparing the substrate containing the double layer catalyst. The steam reforming catalyst layer is achieved by dipping a monolith substrate into the steam reforming catalyst slurry and the excess slurry is then removed with an air knife to obtain the target wet gain of the washcoat on the monolith substrate. The resultant substrate is then dried for one hour at 120° C., and then calcined at 550° C. in air for two hours.

The substrate containing the steam reforming catalyst layer is then dipped into the catalytic partial oxidation catalyst slurry and the excess slurry is then removed with an air knife to obtain the target wet gain of the washcoat on the monolith substrate. The resultant substrate is then dried for one hour at 120° C., and then calcined at 550° C. in air for two hours.

A comparison was made between two catalyst members: a double-layered catalyst member in accordance with Example C and two single layer catalyst members made in accordance with Examples A and B. The double-layered member as well as the two single layer catalyst members utilized a monolith substrate consisting of a high surface area alumina obtained from Corning Glass Works; each member was cylindrical in shape and had a diameter of 1.91 cm, a length of 7.62 cm and 400 cells per $in^2$. The same catalytic partial oxidation catalyst and steam reforming catalyst formulations were used for all members. The composition of the catalytic partial oxidation and steam reforming layers are set forth below. To the extent possible, each member was treated in a manner such that the amount of the catalytic partial oxidation and steam reforming layers in the double-layered catalyst member of the invention equaled the total amount of the catalytic partial oxidation layer and the steam reforming catalyst layer in the two single-layered catalyst members.

In the case of the double-layered catalyst member of the invention, the bottom layer consisted of 2.40 $g/in^3$ of the steam reforming catalyst formulation and the top layer consisted of 1.42 $g/in^3$ of the catalytic partial oxidation catalyst layer. In the case of the two single-layered catalyst members, one member consisted of 1.42 $g/in^3$ of the catalytic partial oxidation catalyst layer on one monolith substrate and the second member consisted of 2.40 $g/in^3$ of the steam reforming catalyst layer on the second monolith substrate. The procedure for preparing the catalyst members was that described in Examples A, B and C. The formulations were as follows:

| Ingredient | CPO Catalyst, $g/in^3$ | SR Catalyst, g/in3 |
|---|---|---|
| $Al_2O_3$ Powder | 0.928 | 1.700 |
| $Pd(NO_3)_2$ | 0.0568 | — |
| $H_2Pt_2(OH)_6$ | 0.0059 | 0.0119 |
| $Rh(NO_3)_3$ | — | 0.00594 |
| Ba oxide | 0.0400 | 0.096 |
| Ce oxide | 0.0400 | 0.052 |
| La oxide | 0.0330 | — |
| Sr oxide | 0.0400 | 0.040 |
| Zr oxide | 0.0400 | 0.052 |
| XZO 738* | 0.3000 | 0.500 |

*XZO 738 is a composite of cerium and zirconium oxides.

The resultant catalyst members were then placed in a laboratory autothermal reactor and an inlet stream was subjected to catalytic partial oxidation and steam reforming. The composition of the inlet stream(i.e., methane, ethane, nitrogen, oxygen and water) and the results obtained by the use of the dual layered catalyst member of the invention versus the two single catalyst members at varying oxygen-:carbon and water:carbon ratios are set forth in Tables I and II below. The tests were carried out in an autothermal reactor in which the inlet stream was heated to a temperature of 200° C. and was admitted into the reactor at a space velocity of 44,000 volumes/hour. After the inlet gas was stabilized the reactor temperature was raised from 200° C. to about 550° C. The methane conversion and the product gas composition was measured by an Agilent Micro Gas Chromatograph. The results are set forth below in Tables I and II.

TABLE I

Double-Layered Catalyst Member of the Invention

| $O_2$:C | $H_2O$:C | $N_2$. % | $O_2$. % | $CH_4$. % | $C_2H_6$. % | Product $H_2$. % | Product CO. % | Product $CO_2$. % |
|---|---|---|---|---|---|---|---|---|
| 0.36 | 1.60 | 38.73 | 0.54 | 13.43 | 0.05 | 31.64 | 14.47 | 2.17 |
| 0.43 | 1.42 | 42.88 | 0.47 | 12.18 | 0.05 | 36.39 | 12.58 | 5.23 |
| 0.52 | 1.83 | 41.16 | 0.51 | 5.13 | 0.02 | 35.40 | 10.85 | 6.15 |
| 0.63 | 2.13 | 42.92 | 0.51 | 0.00 | 0.02 | 36.02 | 9.95 | 7.20 |

TABLE II

Two Single-Layered Catalyst Members

| $O_2$:C | $H_2O$:C | $N_2$. % | $O_2$. % | $CH_4$. % | $C_2H_6$. % | Product $H_2$. % | Product CO. % | Product $CO_2$. % |
|---|---|---|---|---|---|---|---|---|
| 0.34 | 2.13 | 37.12 | 0.29 | 17.21 | 0.06 | 29.67 | 9.98 | 4.86 |
| 0.36 | 1.28 | 36.94 | 0.27 | 14.33 | 0.03 | 32.51 | 9.90 | 5.82 |
| 0.41 | 1.42 | 37.83 | 0.24 | 11.37 | 0.03 | 33.10 | 9.51 | 6.43 |
| 0.45 | 1.60 | 38.48 | 0.32 | 7.26 | 0.02 | 36.16 | 7.91 | 8.52 |
| 0.52 | 1.83 | 39.65 | 0.27 | 6.30 | 0.01 | 35.22 | 8.43 | 7.94 |

As may be seen from the results in Tables I and II, the double-layered catalyst member of the invention produced more product hydrogen and more carbon monoxide, but less carbon dioxide than the two single-layered catalyst members. Note that the carbon monoxide can be readily converted into further quantities of hydrogen by contacting the product effluent with a shift catalyst in the presence of water. Such results clearly indicate that the double-layered catalyst member of the invention is much more efficient than two single-layered catalyst members containing the same composition.

What is claimed is:

1. A process for generating a hydrogen-rich effluent from a hydrocarbon feed which comprises the steps of:
   (a) introducing a preheated inlet stream comprising a hydrocarbon feed, water and air into an autothermal reactor containing a layered catalyst member and contacting the stream with the member at a temperature sufficient to initiate and sustain both catalytic partial oxidation and steam reforming;
   (b) catalytically partially oxidizing at least part of the hydrocarbon feed to produce an effluent comprising hydrogen and carbon oxides; and
   (c) steam reforming hydrocarbons remaining in the feed to produce a hydrogen-rich effluent,
said member comprising a monolith substrate containing on a surface thereof at least one layer of a steam reforming catalyst in contact with at least one layer of a catalytic partial oxidation catalyst.

2. The process of claim 1 wherein the monolith subs contains on a surface thereof at least one layer of the steam reforming catalyst and at least one layer of the catalytic partial oxidation catalyst with said layer of the catalytic partial oxidation catalyst overlying, and in contact with, said steam reforming catalyst layer.

3. The process of claim 1 wherein the steam reforming catalyst layer is present in the form of multiple steam reforming catalyst layers in which each of such multiple layers comprises a different steam reforming catalyst composition.

4. The process of claim 1 wherein the catalytic partial oxidation catalyst layer is present in the form of multiple catalytic partial oxidation catalyst layers in which each of such multiple layers comprises a different catalytic partial oxidation catalyst composition.

5. The process of claim 1 wherein the monolith substrate contains on a surface thereof a graduated layer of the steam reforming catalyst in contact with a graduated layer of the catalytic partial oxidation catalyst.

6. The process of claim 1 wherein the catalyst member is oriented in respect to the inlet stream such that the inlet stream initially comes in contact with the catalytic partial oxidation catalyst layer.

7. The process of claim 1 including the further step of withdrawing the hydrogen-rich gas effluent resulting from step (c) and subjecting such effluent to a water gas shift reaction whereby such effluent is contacted with a catalyst such that carbon monoxide present in such effluent will react with water to produce carbon dioxide and a further quantity of hydrogen.

8. The process of claim 1 wherein the inlet stream is preheated to a temperature of about 200 to about 900° C. prior to introduction into the autothermal reactor.

9. The process of claim 1 wherein the autothermal reactor is maintained at a temperature of about 250 to about 1100° C.

10. The process of claim 1 wherein the stream is introduced into the reactor at a volumetric hourly rate of about 2,000 to about 500,000 volumes per volume of monolith substrate.

11. The process of claim 1 wherein the monolith substrate comprises a porous ceramic.

12. The process of claim 11 wherein the porous ceramic is selected from the group consisting of alumina, alumina-silica, alumina-silica-titania, mullite, cordierite, zirconia, zirconia-ceria, zirconia-spinel, zirconia-mullite and silicon-carbide.

13. The process of claim 12 wherein the porous ceramic is present in the form of a foam.

14. The process of claim 1 wherein the monolith substrate comprises a heat- and oxidation-resistant metal.

15. The process of claim 14 wherein the metal is selected from the group consisting of stainless steel and iron/chromium alloy.

16. The process of claim 14 wherein the metal is present in the form of a foam.

17. The process of claim 1 wherein the monolith substrate is present in the form of a heat exchanger.

18. The process of claim 14 wherein a surface of the monolith substrate contains a binder coating interposed between such surface and the steam reforming catalyst layer or the catalytic partial oxidation catalyst layer.

19. The process of claim 18 wherein the binder comprises a high surface area alumina.

20. The process of claim 1 wherein the steam reforming catalyst layer and the catalytic partial oxidation catalyst layer are present in the form of washcoats comprising alumina which has been impregnated with the steam reforming catalyst and alumina which has been impregnated with the catalytic partial oxidation catalyst.

21. The process of claim 20 wherein the alumina comprises gamma-alumina mixed with one or more rare earth metal oxides and/or one or more alkaline earth meal oxides.

22. The process of claim 21 wherein the gamma-alumina is mixed with one or more oxides of a metal selected from the group consist of lanthanum, cerium, zirconium, praesidium, yttrium calcium, barium strontium, magnesium and mixtures thereof.

23. The process of claim 21 wherein the rare earth metal oxides and/or the alkaline earth metal oxides are present in an amount of about 2 to about 10 weight percent, based on the weight of the oxides plus gamma alumina.

24. The process of claim 20 wherein each washcoat is present in an amount of about 0.02 to about 5.0 g/in$^3$ of the monolith substrate.

25. The process of claim 1 wherein the catalytic partial oxidation catalyst layer comprises one or more platinum group metal components.

26. The process of claim 25 wherein the platinum group metal is selected from the group consisting of platinum, palladium, rhodium, iridium, rhodium, iridium, osmium, ruthenium and mixtures thereof.

27. The process of claim 25 wherein the platinum group metal components comprise a mixture of palladium and platinum components.

28. The process of claim 27 wherein the catalytic partial oxidation catalyst layer comprises, on an elemental metal basis, about 10 to about 90% by weight of palladium components and about 10 to about 90% by weight of platinum components.

29. The process of claim 1 wherein the catalytic partial oxidation catalyst layer is present in an amount of about 0.1 to about 3.0 g/in$^3$ of monolith substrate.

30. The process of claim 1 wherein the steam reforming catalyst layer comprises a nickel component, a cobalt component or a mixture of nickel and cobalt components.

31. The process of claim 1 wherein the steam reforming catalyst layer comprises more platinum group metal components.

32. The process of claim 31 wherein the platinum group metal component is selected from the group consisting of platinum, palladium, rhodium, iridium, osmium, ruthenium and mixtures thereof.

33. The process of claim 32 wherein the platinum group metal component comprises, on an elemental metal basis, about 10 to about 100% by weight of rhodium components and about 90 to about 0% by weight of platinum components.

34. The process of claim 1 wherein the steam reforming catalyst layer is present mount of about 0.1 to about 5.0 g/in$^3$ of the monolith substrate.

* * * * *